United States Patent [19]
d'Auria

[11] 4,150,870
[45] Apr. 24, 1979

[54] ADJUSTABLE DISTRIBUTOR DEVICE FOR SHARED TRANSMISSION OF RADIANT ENERGY

[75] Inventor: Luigi d'Auria, Paris, France

[73] Assignee: Thomson-CSF, Paris, France

[21] Appl. No.: 817,011

[22] Filed: Jul. 19, 1977

[30] Foreign Application Priority Data

Jul. 23, 1976 [FR] France ................ 76 22621

[51] Int. Cl.$^2$ ............................... G02B 5/16
[52] U.S. Cl. .................. 350/96.16; 350/96.24
[58] Field of Search ........... 350/96 C, 96 WG, 96 B, 350/96.15, 96.16, 96.20, 96.21, 96.22, 96.24, 96.25

[56] References Cited

U.S. PATENT DOCUMENTS

| | | | |
|---|---|---|---|
| 3,874,780 | 4/1975 | Love | 350/96 WG |
| 3,874,781 | 4/1975 | Thiel | 350/96 WG X |
| 3,883,222 | 5/1975 | Gunderson | 350/96 WG X |
| 3,901,581 | 8/1975 | Thiel | 350/96 WG X |

FOREIGN PATENT DOCUMENTS

| | | | |
|---|---|---|---|
| 1946693 | 8/1970 | Fed. Rep. of Germany | 350/96 B |
| 2016498 | 10/1971 | Fed. Rep. of Germany | 350/96 C |
| 2034344 | 1/1972 | Fed. Rep. of Germany | 350/96 C |
| 2408623 | 9/1975 | Fed. Rep. of Germany | 350/96 C |

OTHER PUBLICATIONS

Hudson et al., "The Star Coupler: A Unique Interconnection Component. . .," Applied Optics, vol. 13, No. 11, Nov. 1974, pp. 2540–2545.
Milton et al., "Optical Access Couplers. . .," Applied Optics, vol. 15, No. 1, Jan. 1976, pp. 244–252.
Thorp, "Optical Path Length Equalizer," IBM Tech. Discl. Bulletin, vol. 19, No. 4, Sep. 1976, p. 1345.

*Primary Examiner*—John K. Corbin
*Assistant Examiner*—John D. Lee
*Attorney, Agent, or Firm*—Cushman, Darby & Cushman

[57] ABSTRACT

The present invention relates to an adjustable radiation distributor for fiber optics networks. This distributor effects distribution of an incident radiation between several optical cables by means of a fixed coupling element of fork shape, the body of which communicates with an optical linking cable. One of the ends of the optical linking cable can be mechanically displaced.

8 Claims, 6 Drawing Figures

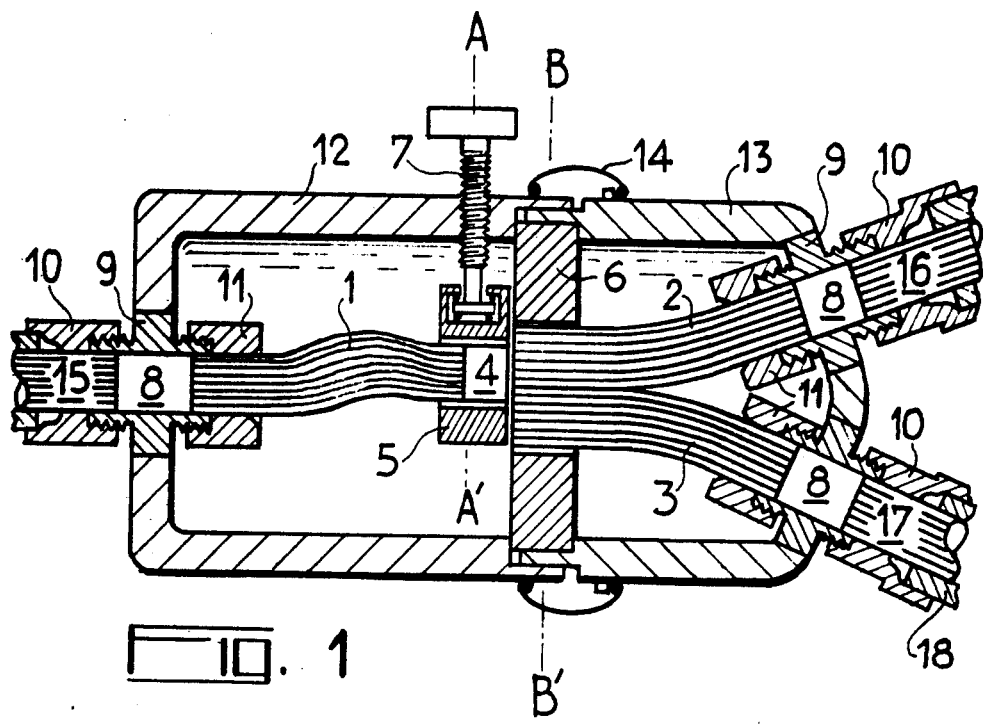
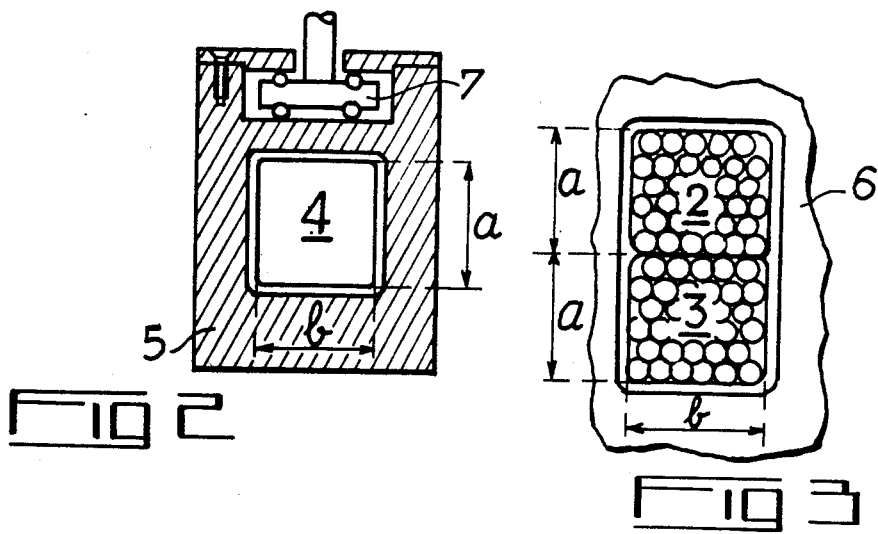

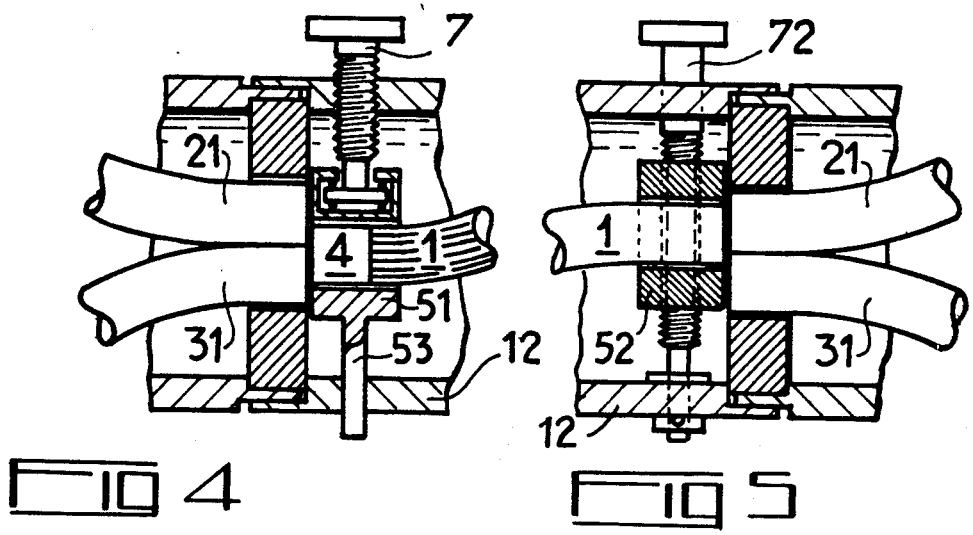

ADJUSTABLE DISTRIBUTOR DEVICE FOR SHARED TRANSMISSION OF RADIANT ENERGY

The present invention relates to radiation transmission systems using optical fibers. More particularly, the invention is concerned with the distribution between several receptor optical cables of the radiant energy supplied by a feeder optical cable. In the description which now follows, the term optical cable should be taken as applying equally to a single optical fiber and to a bundle of such fibers, it being understood that in this latter case, of course, the individual fibers of the bundle share the radiant energy to be transmitted.

The usefulness of an adjustable distributor device for the guided radiation carried by an optical fiber, is apparent in particular in the situation where star pattern optical communication is to be established between an emitting source and several receptors located at different distances. It is desirable that despite the greater or lesser attenuation levels attendant on these different distances, the energy fractions received by the various receptors should have comparable values. Accordingly, it is necessary to distribute the energy radiated by the source, in proportion with the attenuation levels encountered in the various branches of the interconnecting optical network.

In order to achieve adjustable energy distribution, optical devices are known, which focus the image of the exit aperture of the feeder cable in such a way that it covers the entry aperture of a receptor cable; intervening optical elements arranged in the path of the light rays pick off a variable fraction of the focussed radiation, which is projected into the entry aperture of a second receptor cable. A distributor device of this kind has recourse to bulky optical elements and can be problematical to handle.

In accordance with the present invention, there is provided an adjustable distributor device providing shared transmission of radiant energy between an optical feeder cable and at least two optical receptor cables, said distributor device comprising an input connector, N output connectors, and optical coupling means providing a shared transmission of radiant energy from said input connector to said N output connectors; said optical coupling means comprising a fixed radiation conductor element of forked design, having N legs respectively connected to said N output connectors and ending in a flat entry face, a mixer element made of a single optical fiber having an exit face communicating with said flat entry face, and an optical cable linking said input connector to the entry face of said mixer element; said distributor further comprising mechanical means displacing said mixer element, for adjusting the distribution of said radiant energy between said legs.

For a better understanding of the present invention and to show how the same may be carried into effect, reference will be made to the ensuing description and the attached drawings among which:

FIG 1 illustrates a sectional view of an adjustable distributor device in accordance with the invention;

FIGS. 2 and 3 illustrate sections through opposite faces of the coupling means;

FIGS. 4 and 5 illustrate variant embodiments of the device shown in FIG. 1; and

Figure 6:
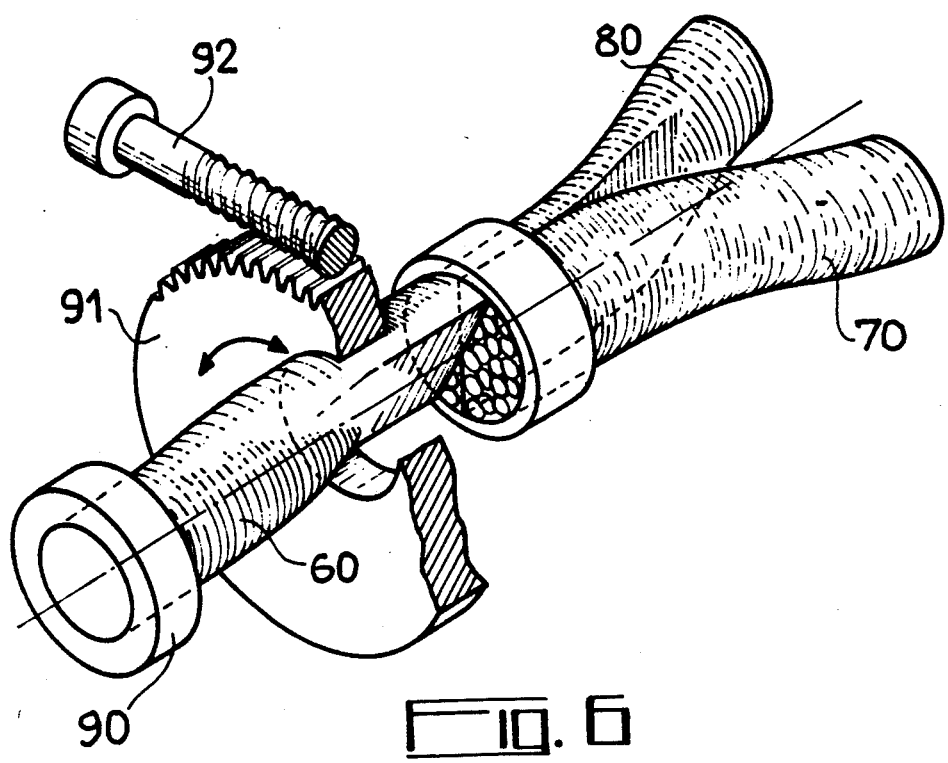
FIG. 6 illustrates another variant embodiment of an adjustable distributor device.

FIG. 1 shows a longitudinal section through an adjustable distributor device in accordance with the invention. This distributor produces shared distribution of the radiant energy carried by the bunch of optical fibers constituting the optical cable 15, this shared distribution taking place between two other optical cables 16 and 17. The cables 15 16, 17 are connected to the adjustable distributor by detachable connectors with bases 9 and sleeves 10 to which the protective sheaths 18 of the cables are attached.

Adjustable energy distribution is performed through the agency of optical coupling means which comprise: a fixed fork-shaped element with two legs 2 and 3, a single mixer section 4 whose exit face communicates with the flat entry face of the fixed element 2, 3 and an optical cable 1 communicating with the entry face of the mixer section 4.

An assembly frame 5 establishing the connection between the cable 1 and the single fiber 4, can be displaced linearly by the operation of a screw 7. A ball stop joins the two elements 5 and 7 together in their displacement along the axis AA'. The screw 7 is screwed into a thread formed in the housing 12 of the device. The optical cables 2 and 3 are respectively connected to the bases 9 of the output connectors by means of cylindrical rings 11. Their other ends are both located in an opening formed in the mounting wall 6. The optical cables 1, 2, 3 are positioned while the housing halves 12 and 13 are apart, these latter subsequently being assembled together by means of clips 14 for example.

FIG. 1 also shows how single optical fibers 8 performing a mixer function are inserted into the bases 9 of the connectors.

The operation of the distributor device shown in FIG. 1 requires an optical cable 1 sufficiently long and flexible to follow the displacement of the section of single optical fiber 4. This can be achieved by using a bundle comprising, by way of non-limitative example, around sixty fibers having diameters of the order of sixty microns. To minimize transmission losses due to alignment errors, the exit face of the single fiber section 4 should displace parallel to the entry face constituted by the body of the fork-shaped coupling elements 2, 3. Moreover, the single optical mixer fibers 4 and 8 are used to achieve optical coupling which does not fluctuate under the effect of matching defects arising out of non-uniform arrangement of the fibers in one bunch in relation to those in another. In particular, the mixing effect achieved prevents the total loss of coupling in the limiting case in which all the broken fibers in one bundle happen to be located opposite the unbroken fibers in another bundle and vice versa.

FIGS. 2 and 3 illustrate sections taken in planes AA' and BB' indicated in FIG. 1. To achieve coupling with minimum loss and progressive shared distribution of the radiated energy coming from the single optical fiber 4, the present invention provides for the single fiber 4 and the bundles 2 and 3 inserted in the mounting wall 6 to have identical square or rectangular cross-sections. In addition, the bundles 2 and 3 are arranged close beside one another along a separating line perpendicular to the direction of displacement AA' of the single mixer fiber 4. The progressive distribution effect is brought about in such a way that the relative displacement coordinate x varies from 0 to a. In accordance with a preferred embodiment, the sections of the cables 1, 2 and 3 are cylindrical at the ends joining the connectors and rectangular where they link up with the mixer fiber 4. The bunching of the optical fibers used enables this kind of transformation in cross-section to be achieved.

If we consider the optical powers P, $P_1$, $P_2$ and $P_3$ respectively carried by the cables 15, 1, 2 and 3 and the mean stacking factors $k_1$, $k_2$ and $k_3$ of the optical cables 1, 2 and 3, then the energy balance may be stated as follows:

$$P_1 = k_1 P$$

$$P_2 = (a-x)/a \; k_2 P_1$$

$$P_3 = x/a \; k_3 P_1$$

The stacking factor is defined as being equal to the sum of the areas of the cores of a cable, divided by the total area occupied by the bundle.

The result is that in order to reduce the transmission losses it is necessary to increase the stacking factors $k_1$, $k_2$ and $k_3$. The variant embodiments shown in FIGS. 4 and 5 offer improved factors $k_2$ and $k_3$ since the optical cables 21 and 31 are constituted by single optical fibers. These fibers can be produced with a right section which changes from the square or rectangular to the circular. In the case of the variant embodiment shown in FIG. 5, the optical cable 1 is also constituted by a single fiber whose length diameter ratio is sufficiently large to yield the requisite flexibility taking into account the displacement which the frame 52 must perform. It should be noted that the single fiber 1 does duty as mixer fiber.

In FIGS. 4 and 5, various design details have also been shown. In FIG. 4, the guiding of the frame 51 is performed by a rod 53 sliding in a hole formed in the wall of the housing 12. In FIG. 5, the adjuster screw 72 passes through the frame 52 in a thread set back from the passage provided for the attachment of the fiber 12 in the frame 52.

Without departing from the scope of the present invention, it is possible for the adjacent ends of the optical cables 2 and 3 to number more than two.

For example, a four-branch coupling element can be provided, whose ends are arranged at right-angles to one another. By displacing the end of the optical cable 1 in two different directions, the radiated energy can then be distributed between the four branches.

FIG. 6 illustrates the chief elements of a distributor device in which adjustment is produced by rotation. Coupling is performed by a single optical mixer fiber 60 having a circular section at one end and a semi-circular section at the other. This fiber 60 communicates with the ends of two optical cables. The optical cables 70 and 80 have their adjacent ends formed in a semicircular shape so that together they form a circular entry face. Those ends of the two cables 70 and 80 which are spaced apart can have circular sections. The single fiber 60 is fixed to a pivoting mounting 91 exhibiting a toothed ring. It can also rotate in a location 90 doing duty as a bearing. An endless adjuster screw 92 meshes with the toothed ring carried by the pivoting mounting 91. By operating the screw 92, the fiber 60 is made to pivot about an axis passing through the centre of the entry face of the coupling element 70, 80. Thus, the radiated energy coming from the semi-circular section of the fiber 60 can be distributed in any desired proportion between the entry half-faces of the branches 70 and 80. In this embodiment the fiber 60 can be totally rigid.

What I claim is:

1. An adjustable distributor device providing shared transmission of radiant energy between an optical feeder cable and at least two optical receptor cables, said distributor device comprising an input connector, N output connectors, and optical coupling means providing a shared transmission of radiant energy from said input connector to said N output connectors; said optical coupling means comprising a fixed radiation conductor element of forked design, having N legs respectively connected to said N output connectors and ending in a flat entry face, a mixer element made of a single optical fiber having an exit face communicating with said flat entry face, and an optical cable linking said input connector to the entry face of said mixer element; said distributor further comprising mechanical means displacing said mixer element, for adjusting the distribution of said radiant energy between said legs.

2. An adjustable distributor as claimed in claim 1, wherein the legs of said fixed elements are constituted by optical cables whose first ends are arranged side by side in said entry face while their second ends are connected to said output connectors.

3. An adjustable distributor as claimed in claim 2, wherein said first ends have rectangular sections; said mixer element having a rectangular section of substantially similar extent to one of said rectangular sections; said mechanical means displacing said mixer element in at least one direction parallel to one of the sides of said sections.

4. An adjustable distributor as claimed in claim 2, wherein said first ends have cross-sections of circular sector shape; said mixer element having a circular section of an extent substantially equal to one of said sections; and said mechanical means causing said mixer element to pivot about an axis passing through the centre of said flat entry face perpendicularly thereto.

5. An adjustable distributor as claimed in claim 1, wherein said optical cable is a deformable element made up of a bundle of optical fibers.

6. An adjustable distributor as claimed in claim 1, wherein said mixer element and said optical cable are combined into a single optical fiber.

7. An adjustable distributor as claimed in claim 1, wherein said legs are constituted by bundles of optical fibers; said bundles of fibers being connected to said connectors through single fiber mixer sections.

8. An adjustable distributor as claimed in claim 1, wherein said legs are constituted by single fibers.

* * * * *